(12) United States Patent
Hallander et al.

(10) Patent No.: US 9,840,041 B2
(45) Date of Patent: Dec. 12, 2017

(54) STIFFENING ELEMENT AND REINFORCED STRUCTURE

(71) Applicant: SAAB AB, Linköping (SE)

(72) Inventors: Per Hallander, Linköping (SE); Anders Lundberg, Vikingstad (SE); Tonny Nyman, Linköping (SE); Mikael Petersson, Linköping (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 15/105,705

(22) PCT Filed: Dec. 20, 2013

(86) PCT No.: PCT/SE2013/051586

§ 371 (c)(1),
(2) Date: Jun. 17, 2016

(87) PCT Pub. No.: WO2015/094059

PCT Pub. Date: Jun. 25, 2015

(65) Prior Publication Data

US 2016/0375632 A1    Dec. 29, 2016

(51) Int. Cl.
*B29C 65/48*      (2006.01)
*B64C 1/12*       (2006.01)
(Continued)

(52) U.S. Cl.
CPC .............. *B29C 65/48* (2013.01); *B29C 65/02* (2013.01); *B29C 66/00145* (2013.01);
(Continued)

(58) Field of Classification Search
CPC . B29C 65/48; B29C 70/386; B29C 66/00145; B29C 70/382; B29C 65/02;
(Continued)

(56) References Cited

U.S. PATENT DOCUMENTS 3,333,322 A * 8/1967 Toffolon ............. E04L 31/3205
                                                        29/463
4,904,109 A    2/1990 Anderson
(Continued)

FOREIGN PATENT DOCUMENTS

DE    102004035170 B3    8/2005
DE    CA-2702953 A1 *    5/2009    ............. B64C 1/064
(Continued)

OTHER PUBLICATIONS

PCT/ISA/210—International Search Report, dated Sep. 16, 2014 (Issued in Application No. PCT/SE2013/051586).
(Continued)

*Primary Examiner* — Jeanette E Chapman
(74) *Attorney, Agent, or Firm* — Venable LLP; Jeffri A. Kaminski

(57) ABSTRACT

A stiffening element including at least a first stiffening profile and at least a second stiffening profile. The first stiffening profile includes a profile member. At least one structural flange is connected to the profile member. A through-passage extends through the profile member. At least one support flange is connected to the profile member. The second stiffening profile includes a bottom portion and at least one support side portion connected to the bottom portion. A method for manufacturing a stiffening element. A method for manufacturing a reinforced structure, where the reinforced structure includes at least one structural element and at least one stiffening element.

12 Claims, 11 Drawing Sheets

(51) Int. Cl.
  *B29D 99/00* (2010.01)
  *B64C 1/06* (2006.01)
  *B29C 65/02* (2006.01)
  *B29C 65/00* (2006.01)
  *B29C 70/38* (2006.01)
  *B29K 105/06* (2006.01)
  *B29L 31/30* (2006.01)

(52) U.S. Cl.
  CPC .......... *B29C 70/382* (2013.01); *B29C 70/386* (2013.01); *B29D 99/0014* (2013.01); *B64C 1/061* (2013.01); *B64C 1/064* (2013.01); *B64C 1/12* (2013.01); *B29K 2105/06* (2013.01); *B29L 2031/3076* (2013.01); *Y02T 50/433* (2013.01)

(58) Field of Classification Search
  CPC .......... B64C 1/064; B64C 1/061; B64C 1/12; B29D 99/0014; B29L 2031/3076; B29K 2105/06; Y02T 50/433
  See application file for complete search history.

(56) References Cited

U.S. PATENT DOCUMENTS

| | | | |
|---|---|---|---|
| 5,242,523 A * | 9/1993 | Willden | B29C 70/44 156/245 |
| 5,893,534 A * | 4/1999 | Watanabe | B64C 1/064 244/119 |
| 6,190,484 B1 * | 2/2001 | Appa | B29C 70/32 156/169 |
| 6,364,250 B1 | 4/2002 | Brinck et al. | |
| 7,527,222 B2 * | 5/2009 | Biornstad | B29C 53/587 244/119 |
| 7,861,480 B2 * | 1/2011 | Wendelburg | E04C 3/07 52/471 |
| 9,315,252 B2 * | 4/2016 | Dolzinski | B64C 1/064 |
| 9,637,213 B2 * | 5/2017 | Joern | B64C 1/06 |
| 2001/0035249 A1 | 11/2001 | Kondo et al. | |
| 2001/0051251 A1 | 12/2001 | Noda et al. | |
| 2002/0081415 A1 * | 6/2002 | Toi | B29C 70/443 428/102 |
| 2005/0263645 A1 * | 12/2005 | Johnson | B61D 17/041 244/119 |
| 2006/0226287 A1 * | 10/2006 | Grantham | B64C 1/12 244/119 |
| 2007/0175575 A1 * | 8/2007 | Rubin | B29C 70/504 156/221 |
| 2008/0128550 A1 * | 6/2008 | Roming | B64C 1/061 244/119 |
| 2008/0230652 A1 * | 9/2008 | Biornstad | B29C 53/587 244/120 |
| 2009/0057487 A1 | 3/2009 | Velicki et al. | |
| 2009/0266936 A1 | 10/2009 | Fernandez et al. | |
| 2009/0272846 A1 | 11/2009 | Anast et al. | |
| 2009/0277994 A1 * | 11/2009 | Lobato | B64C 1/061 244/119 |
| 2009/0283638 A1 * | 11/2009 | Arevalo Rodriguez | B29D 99/0014 244/119 |
| 2009/0320398 A1 * | 12/2009 | Gouvea | B29C 66/721 52/309.1 |
| 2010/0129589 A1 * | 5/2010 | Senibi | B32B 5/18 428/71 |
| 2011/0185555 A1 | 8/2011 | Gallant et al. | |
| 2012/0132756 A1 * | 5/2012 | Roming | B64C 1/061 244/131 |
| 2012/0153082 A1 * | 6/2012 | Rosman | B64C 1/068 244/120 |
| 2012/0248247 A1 | 10/2012 | Vinue et al. | |
| 2013/0089712 A1 * | 4/2013 | Kwon | B64C 1/064 428/174 |
| 2013/0164465 A1 * | 6/2013 | Lacombe | B64C 1/06 428/34.1 |
| 2013/0181092 A1 | 7/2013 | Cacciaguerra et al. | |
| 2015/0053333 A1 * | 2/2015 | Prebil | B29C 70/504 156/222 |
| 2015/0225065 A1 * | 8/2015 | Brunner | B64C 1/12 244/131 |
| 2016/0257032 A1 * | 9/2016 | Bottero | B29C 33/52 |
| 2016/0368226 A1 * | 12/2016 | Encinosa | B29C 65/02 |

FOREIGN PATENT DOCUMENTS

| | | | | |
|---|---|---|---|---|
| DE | CA-2715277 A1 * | 9/2009 | ............ | B64C 1/064 |
| DE | WO-2013093323 A1 * | 6/2013 | ............ | B64C 1/064 |
| DE | EP-2628677 A1 * | 8/2013 | ............ | B64C 1/061 |
| DE | EP-2746038 A1 * | 6/2014 | ........... | B29C 70/545 |
| DE | 102014103438 A1 * | 1/2015 | ........ | B29C 45/0005 |
| DE | EP-2942269 A1 * | 11/2015 | ............ | B64C 1/064 |
| EP | 1149687 A2 | 10/2001 | | |
| FR | 864983 A * | 5/1941 | ............ | B64C 1/061 |
| FR | 2914622 A1 * | 10/2008 | ............ | B64C 1/061 |
| FR | 2977296 A1 | 1/2013 | | |
| FR | EP-2832634 A2 * | 2/2015 | ............ | B64C 1/061 |
| GB | 2100771 A | 1/1983 | ............ | E04C 2/384 |
| JP | H058316 A | 1/1993 | | |
| JP | EP-1149687 A2 * | 10/2001 | .......... | B29C 70/345 |
| JP | 2008184156 A * | 8/2008 | .......... | B29C 53/587 |
| JP | 2008222221 A * | 9/2008 | .......... | B29C 53/587 |
| JP | 2012153362 A * | 8/2012 | .......... | B29C 53/587 |
| WO | WO-02/20248 A1 | 3/2002 | | |
| WO | WO-2006/001859 A1 | 1/2006 | | |
| WO | WO-2008133748 A2 * | 11/2008 | .......... | B29C 53/587 |
| WO | CA-2828723 A1 * | 4/2014 | ............ | B64C 1/069 |
| WO | EP-2960150 A1 * | 12/2015 | ............ | B64C 1/064 |

OTHER PUBLICATIONS

PCT/ISA/237—Written Opinion of the International Searching Authority, dated Sep. 16, 2014 (Issued in Application No. PCT/SE2013/051586).

European Search Report dated Jun. 14, 2017 in Patent Application No. 13 899 846.3.

* cited by examiner

STIFFENING ELEMENT AND REINFORCED STRUCTURE

CROSS-REFERENCE TO RELATED APPLICATIONS

The application is the national phase under 35 U.S.C. §371 of PCT/SE2013/051586 filed 20 Dec. 2013.

TECHNICAL FIELD

The present invention relates to a stiffening element adapted to be arranged on a surface of a structural element and a reinforced structure comprising at least one stiffening element and at least one structural element. The present invention also relates to a method for manufacturing a stiffening element and a method for manufacturing a reinforced structure comprising at least one stiffening element and at least one structural element. The present invention relates, but is not limited, to aircraft industry.

BACKGROUND ART

Traditional composite structures for airplane industry are often made up of stiffened panels of monolithic shells or sandwich structures, assembled together with shell or panel stiffeners such as stringers. Composite prepreg material i.e. layer of fiber material preimpregnated with resin are commonly used in the manufacture of stiffenings. Composite prepregs are high in strength and light in weight, which makes them useful materials for aircraft structures, automobiles, ships, etc.

Today stringers including advanced integrated panel stiffeners such as hat-shaped, I-shaped and Z-shaped profiles are being more frequently used in stiffened panels of aircraft structures.

For example, the EP application No. 1149687B1 discloses a method for producing a body structure composed of a stiffened panel. The body structure is composed of a skin member, a plurality of stringer members arranged longitudinally of the body structure and a frame member arranged substantially perpendicular to the stringer members and intersecting with the stringer members. The frame member and stringer members are bond to the skin member. The frame member has a cylinder-shaped body structure or an elliptic cylinder-shaped body structure comprising a plurality of outer frame members arranged in a line which is intersected by the stringer members. Joggles provided in both edge portions of the preformed outer frame members are integrated with the preformed stringer members. Furthermore, the inner frame member is bond to the outer frame members to span the stringer members and to form a continuous frame member.

In general the manufacturing of structures having integrated panel stiffening requires many components and operations. Problems with the tolerance of different components may lead to time-consuming shimming operations. Furthermore, the assembly of stiffeners on curved shell structures is of the time consuming as it may require manual operations. These facts may lead to expensive and time consuming manufacturing processes.

For these reasons stiffening elements and structures comprising stiffening elements may be subjected to development and further improvement.

SUMMARY OF INVENTION

The objective of the invention is a stiffening element adapted to be arranged on an element surface of a structural element and intended to be used for strengthening a structure that is subjected to force/load. The invention is particularly, but not exclusively, applicable for the stiffening of airplane structures such as wing shells or fuselages. These objectives are achieved by a stiffening element and a reinforced structure.

The present invention also relates to a method for manufacturing a stiffening element and a method for manufacturing a reinforced structure. Embodiments are defined by the dependent claims. One advantage of the stiffening element according to the present invention is that it is capable of taking up forces/loads. Thus, the stiffening element according to the present invention can be used for strengthening structures.

A further advantages of the stiffening element is that it is adaptable to conform to the geometry of another element such as a curved element surface of a structural element or the like. The stiffening element according to the present invention may thus be regarded as being geometrically compensating. Furthermore, the stiffening elements are adaptable and may be customized to be suitable for different stiffening purposes. The constituent first stiffening profile and the second stiffening profile of the stiffening element are variable within the scope of the appending claim. For example the design of the stiffening profiles and the addition of one or more reinforcement element and/or reinforcement layer and/or adhesive element and/or adhesive layer may be tailored to be suitable for a specific stiffening/adhesive purpose.

Furthermore, the stiffening element and reinforced structure according to the present invention are easy to manufacture.

The stiffening element according to the present invention comprises at least one first stiffening profile and at least one second stiffening profile. The at least one first stiffening profile and the at least one second stiffening profile together form a structural surface of the stiffening element. The at least one first stiffening profile comprises a profile member having a first surface and a second surface opposite to the first surface, a length extending in a first direction, a height extending in a second direction, and a width extending in a third direction. The length and the height define a first plane. The first stiffening profile further comprises at least one structural flange. At least one edge and/or part of the first surface of the profile member and the at least one structural flange are connected. The at least one structural flange is extending in a second plane arranged in an angle $\alpha$ to said first plane, and the at least one structural flange is a part of the structural surface of the stiffening element. A through-passage extends through the profile member of the first stiffening profile, along the third direction of the profile member. The through-passage provides an opening in the profile member. Furthermore, the at least one first stiffening profile comprises at least one support flange having a first support surface and a second support surface. At least one edge and/or surface of the support flange is connected to the profile member and/or the structural flange of the first stiffening profile. The support flange is extending in a third plane arranged in an angle $\beta$ to the first plane and/or arranged in an angle $\gamma$ to the second plane. The at least one second stiffening profile comprises a bottom portion and at least one support side portion. At least one edge and/or surface of the bottom portion and the at least one support side portion are connected. The bottom portion is extending in a forth plane and the at least one support side portion is extending in a fifth plane arranged in an angle $\delta$ to the forth plane. The bottom portion is a part of the structural surface of the stiffening element. The first support surface of the at least one support flange of the first stiffening profile is at least partly arranged adjacently and facing the at least one support side portion of the at least one second stiffening profile. Furthermore, the at least one support flange is directly or indirectly attached at least partially to the at least one support side portion of the at least one second stiffening profile.

In the context of the present invention the term "connected" refers to both cases in which profiles, flanges, members, elements and/or portions or the like are directly or indirectly in contact with each other. Directly in contact refers to cases wherein concerned components abuts each other whereas indirectly in contact refers cases where there is one or more elements or the like interposed between the components concerned. Connected also refers to profiles, flanges, members, elements and/or portions or the like being partially or fully in direct or indirect contact. Furthermore, connected may in the present invention refer to two or more stiffening profiles and/or portions or the like being joined and/or fastened together. This definition of connected applies to all examples of the present invention wherein the term connected is used.

The term "facing" refers to at least two surfaces and/or portions or the like positioned such that they are turned towards each other. They may be in direct contact with each other, in indirect contact with each other through other interposed elements/components or they may be arranged at a distance from each other without departing from the invention. This definition of the term "facing" applies to all examples of the present invention wherein the term is used.

Preferably, in the present invention the at least one second stiffening profile at least partially intersects the at least one first stiffening profile through the through-passage of the first stiffening profile. Alternatively, at least the bottom portion extending in the fourth plane and/or the support side portion extending in the fifth plane of the second stiffening profile at least partially extends near or up to the through-passage of the at least one first stiffening profile.

In the context of the present invention the term "intersect" refers to at least one part of two or more profiles or the like crossing each other and/or overlapping with each other. They may be fully crossing each other and/or overlapping with each other or they may be partially crossing each other and/or overlapping each other. This definition of the term "intersecting" applies to all examples of the present invention wherein the term is used.

The angles α, β, γ and δ of the planes defining the extension of the flanges, portions or the like of the first and the second stiffening profiles are suitably in the range of about 30° to 150°, preferably in the range of about 45° to 135°, more preferably in the range of about 60° to 120°, and preferably all of the angles α, β, γ and δ are within the range of about 30 to 150°.

In the present invention the stiffening element may preferably comprise two first stiffening profiles arranged such that the first surface the profile member of each of the first stiffening profiles are facing away from each other, i.e. the second surfaces of the profile members are facing each other. In such an arrangement at least one reinforcement element and/or reinforcement layer may be provided between the second surfaces of the profile members facing each other. Alternatively or in addition at least one adhesive element and/or adhesive layer may be provided between the second surfaces of the profile members facing each other.

In the present invention preferably at least one of the first stiffening profile, the second stiffening profile and structural element comprises fibers for resin injection and/or resin preimpregnated fibers.

The fibers may suitably be selected from the group consisting of organic fiber or silicon based fiber, carbon fiber, glass fiber and aramid fiber or combinations thereof.

The resin may suitably be a thermosetting resin selected from the group consisting of epoxy resin, bismaleimide resin, cyanate esters based resin, phenyl ethynyl-terminated imide (PETI) resin and phenol resin or combinations thereof; or a thermoplastic resin selected from the group consisting of polyether ether ketone (PEEK), polyether ketone ketone (PEKK), Polyfenylensulfid (PPS), Polyeterimid (PEI), nylon 6, nylon 66, polyethylene terepthalate (PET) or combinations thereof; or mixtures thereof.

A stiffening element, such as described hereinbefore, may be arranged on an element surface of a structural element in order to form a reinforced structure. The reinforced structure may comprise at least one structural element having at least one element surface and at least one stiffening element having a structural surface which is at least partially attached to an element surface of the structural element.

The structural surface and/or element surface of the structural element may be curved and/or adapted to be curved in one or more directions. An element surface and the like that is curved in one direction is referred to as a single curved element surface and an element surface and the like that is curved in more than one direction is referred to as a double curved element surface.

Preferably, the method of manufacturing a stiffening element according to the present inventions comprises a step of providing at least one first stiffening profile. A step of providing at least one second stiffening profile. A step of assembling the at least one first stiffening profile with the at least one second stiffening profile such that the first support surface of the at least one support flange is at least partly arranged adjacently and facing the at least one side portion of the second stiffening profile and a step of co-curing and/or at least partially attaching the at least one first stiffening profile with the at least one second stiffening profile, thus achieving the stiffening element.

Preferably, the method for manufacturing a reinforced structure according to the present invention comprises a step of providing the at least one structural element having at least one element surface A step of providing at least one first stiffening profile. The first stiffening profile comprising a profile member having a first surface and a second surface opposite to the first surface, a length extending in a first direction, a height extending in a second direction, and a width extending in a third direction. The length and the height of the profile member define a first plane. Furthermore, the first stiffening profile comprises at least one structural flange. At least one edge and/or part of the first surface of the profile member and the at least one structural flange are connected. The at least one structural flange is extending in a second plane arranged in an angle α to the first plane. The at least one structural flange is part of the structural surface of the stiffening element. The first stiffening profile is also provided with a through-passage extending through the profile member, along the third direction of the profile member. The through-passage provides an opening in the profile member. Furthermore, the first stiffening profile also comprises at least one support flange having a first support surface and a second support surface. At least one edge and/or surface of the support flange is connected to the profile member and/or the structural flange.

The support flange is extending in a third plane arranged in an angle β to the first plane and/or arranged in an angle γ to the second plane. The method also includes a step of providing at least one second stiffening profile. The second stiffening profile comprises a bottom portion and at least one support side portion. At least one edge and/or surface of the bottom portion and the at least one support side portion are connected. The bottom portion is extending in a forth plane and the at least one support side portion is extending in a fifth plane arranged in an angle δ to the forth plane. The bottom portion is a part of the structural surface of the stiffening element. Furthermore the method comprises the step of assembling the structural surface of the stiffening element on an element surface of the at least one structural element. The method also comprises the step of co-curing and/or at least partially attaching the at least one first stiffening profile and/or the at least one second stiffening profile with an element surface of the at least one structural element, thus achieving the reinforced structure.

The assembly step of the method for manufacturing a stiffening element and the method for manufacturing a reinforced structure may suitably further include assembling the second stiffening profile such that it at least partially intersects the at least one first stiffening profile through the through-passage of the at least one first stiffening profile. Alternatively, the assembly step of the methods may include assembling at least the bottom portion extending in the forth plane and/or the at least one support side portion extending in the fifth plane of the second stiffening profile such that it at least partially extends near or up to the through-passage of the at least one first stiffening profile.

The method for manufacturing a stiffening element and the method for manufacturing a reinforced structure according to the present invention may further comprise a step of providing at least one reinforcement element and/or reinforcement layer to at least one surface of the first stiffening profile and/or the second stiffening profile of the stiffening element, and/or the structural element. Alternatively or in addition at least one adhesive element and/or adhesive layer may be provided to at least one surface of the first stiffening profile and/or the second stiffening profile and/or the structural element.

Furthermore, the step of providing the first stiffening profile and/or the second stiffening profile and/or the structural element of the methods in accordance to the present invention may include a step of forming a material into a predetermined shape.

Preferably, the method for manufacturing a stiffening element and the method for manufacturing a reinforced structure, according to the present invention, comprises the step of arranging fiber reinforced resin by means of at least one of the techniques of Automated Tape Layering (ATL), Automated Fiber Placement (AFP), Pick and Place and Hand Lay-Up (HLU).

The manufacturing methods above may be used in combination with forming such as mechanical forming vacuum forming (including Hot Drape Forming (HDF)), robot forming or combinations thereof. Methods for forming articles comprising fiber reinforced resin are as such previously known and will thus not be disclosed in detail in the present disclosure. It will be readily apparent to the skilled person, depending on the application of the stiffening element or reinforced structure, what would constitute a forming method.

The step of co-curing and/or attaching of the method form manufacturing a stiffening element and the method for manufacturing a reinforced structure, may be performed by sealing at least one of the structural element, the at least one first stiffening profile and the at least one second stiffening profile in a vacuum enclosure. Thereafter, air is evacuated from the vacuum enclosure, and at least one of the at least one of the structural element, the at least one first stiffening profile, and the at least one second stiffening profile are heated.

The co-curing and/or attaching step of the method form manufacturing a stiffening element and the method for manufacturing a reinforced structure may comprise the step of compressing at least one of the structural element, the at least one first stiffening profile and the at least one second stiffening profile in an autoclave.

Alternatively, the method for manufacturing a stiffening element and the method for manufacturing a reinforced structure, according to the present invention, may include at least one of stitching, bolting, welding and adhering the at least one first stiffening profile and/or the at least one second stiffening profile together respectively stitching and/or bolting and/or welding and/or adhering the at least one structural element and/or the at least one first stiffening profile and/or the at least one second stiffening profile together.

Even though the stiffening element according to the present invention is mainly developed for use in aircraft structures, it may also be used in other structures which are subjected to forces/loads and thus require stiffening.

DETAILED DESCRIPTION

Figure 1:
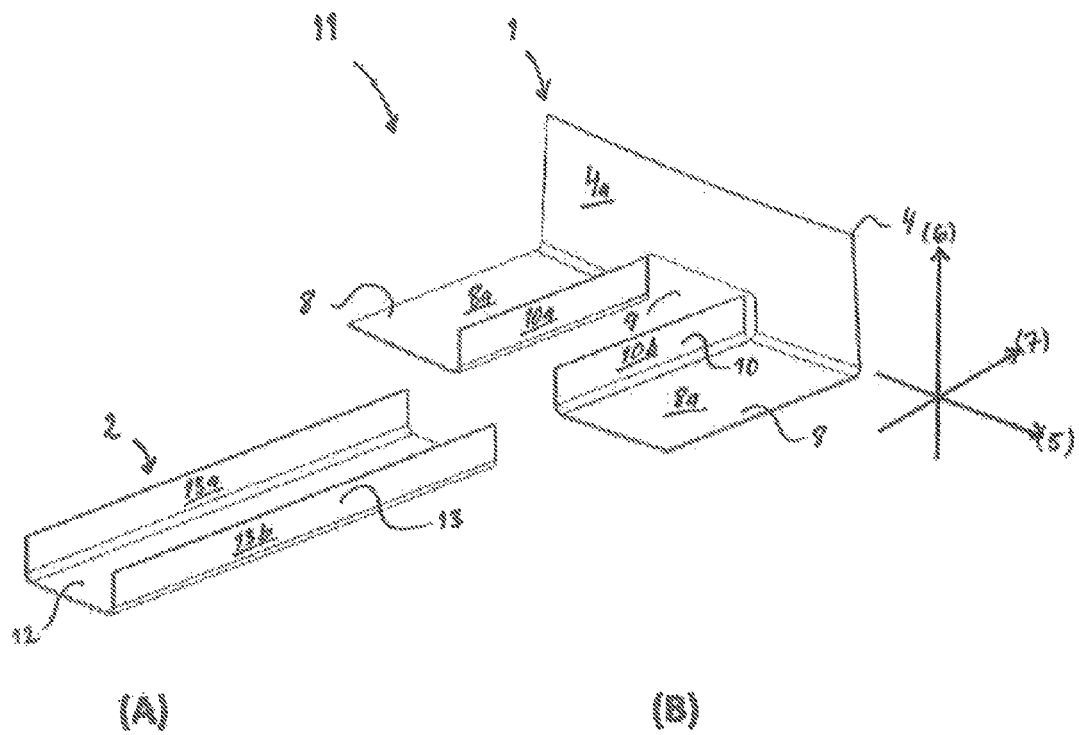
FIG. 1 schematically illustrates an exploded view of a stiffening element comprising a first stiffening profile (FIG. 1B) and a second stiffening profile (FIG. 1A) according to one example of the present invention.

Hereinafter, examples of the present invention will be described in detail with reference to the accompanying figures. The figures shall not be considered drawn to scale as some features may have been exaggerated to more clearly illustrate the invention. Furthermore, the invention is not limited to the figures and the examples discussed but may be varied within the scope of the appended claims.

The invention is particularly, but not exclusively, applicable for the stiffening of airplane structures such as wing shells or fuselages. The invention may also be applicable for the stiffening of other body structures such as body structures of automobiles, ships and wind power plants. The invention is suitable for body structures subjected to forces such as shear forces and bending loads. The body structures are reinforced and stiffened in order to withstand these forces using the present invention.

For the purpose of making the invention clearer, the stiffening element and its constituent profile members are only illustrated as having essentially flat surfaces. For the same reason, the structural element is only illustrated having an essentially flat element surface. However, the present invention is not limited to each of said components having essentially flat surfaces.

The structural element, the first stiffening profile and the second stiffening may each be made up of composite material, such as sheets of composite material. Such sheets have not been depicted in the figures. The structural elements and the stiffening elements are only illustrated as solids in the appending figures for sake of clarity. It should also be noted that even though it is preferred that each of the structural element, the first stiffening profile and the second stiffening profile is made of composite material, the invention is not limited to composite material. For example, one or more of the structural element, the first stiffening profile and the second stiffening profile could be made of metallic material, such as aluminum or its alloys.

In the context of the present application composite material refers to material comprising fiber reinforced resin or epoxy, such as prepregs.

The stiffening element and its constituent stiffening profiles (as well as their different surfaces) may be curved in one direction, hereinafter referred to as a single curved stiffening element respective a single curved stiffening profile, or curved in more than one direction hereinafter referred to as double curved stiffening element respectively a double curved stiffening profile. The stiffening element and its constituent stiffening profiles may alternatively be essentially flat, although adapted to be curved in one or more directions. The structural element may be single curved or double curved or alternatively the structural element may be essentially flat or adapted to be curved in one or more directions.

In accordance with the present invention, the stiffening element comprises at least a first stiffening profile and at least a second stiffening profile. The first and second stiffening profiles together form a structural surface of the stiffening element by being arranged such that a surface of a part of the first stiffening profile is arranged such that a surface of a part of the first stiffening profile is arranged adjacent a surface of a part of the second stiffening profile, preferably in essentially the same plane as a surface of a part of the second stiffening profile.

The structural surface may be adapted to be at least partly attached to a structural element, but may also be self-supporting. In the case of the structural surface being adapted to be at least partly attached to a structural element which is curved in one or more directions, the structural surface may suitably, but not necessarily, be curved in correspondence with the curvature of the structural element.

The first stiffening profile comprises a profile member having a first surface and a second surface, and at least one structural flange, wherein at least one edge and/or part of the first surface of the profile member and the at least one structural flange are connected. The structural flange inter alia serves the purpose of forming a part of the structural surface and thus comprises a surface therefore. The first stiffening profile also comprises at least one support flange, wherein at least one edge and/or surface of the support flange is connected to the profile member and/or the structural flange. The support flange may inter alia serve the purpose of enabling attachment of the first stiffening profile to the second stiffening profile. The support flange is not intended to constitute a part of the structural surface of the stiffening element.

The second stiffening profile comprises a bottom portion and at least one support side portion, wherein at least one edge and/or surface of the bottom portion and the at least one support side portion are connected. The bottom portion may inter alia serve the purpose of forming a part of the structural surface and the at least one support side portion may inter alia serve the purpose of enabling attachment of the second stiffening profile to the first stiffening profile.

In these and other examples of the present invention "connected" refers to both cases in which profiles, flanges, members, elements and/or portions or the like are directly or indirectly in contact with each other. Directly in contact refers to cases wherein concerned components abuts each other whereas indirectly in contact refers cases where there is one or more elements or the like interposed between the components concerned. Connected also refers to profiles, flanges, elements and/or portions or the like being partially or fully in direct or indirect contact. Furthermore, connected may in the present invention refer to two or more stiffening profiles and/or portions or the like being joined and/or fastened together. This definition of connected applies to all examples of the present invention wherein the term connected is used. For example two profiles may be referred to as being connected when they are in indirect contact with each other via an intermediate element and/or layer such as a reinforcement element and/or layer.

Preferably, the first and the second stiffening profiles are monolithic in the sense that the constituent flanges, members, elements, portions and the like of these stiffening profiles are made of one continuous piece of material. Each of the profile member, support flange and structural flange of the first stiffening profile are monolithic as such. However, the profile member and/or support flange and/or structural flange may be joined together by means of attachment means such as bolts, stitching, adhesive or welding. Each of the bottom portion and support side portion of the second stiffening profile are monolithic as such. However, the bottom portion and support side portion may be joined together by means of attachment means such as bolts, stitching, adhesive or welding. Furthermore, the continuous piece of material from which these stiffening profiles are formed may as such comprise composite layers or the like that are not continuous throughout the material.

For sake of clarity the connections between the profiles, flanges, members, elements, and the like of the stiffening profiles of the present invention are shown as being essentially rounded or curved with a radius. The profiles, flanges, members, elements and the like may be bent or folded in order to provide connections with an essentially curved shape or an essentially sharp bend or sharp curvature to adjacent profiles, flanges, members, elements and the like.

The stiffening element according to the present invention comprises at least one first stiffening profile having at least one support flange with a first support surface which is at least partially arranged adjacently and facing at least one support side portion of the at least one second stiffening profile. Said first support surface is preferably adapted to be at least partially attached directly or indirectly to a support side portion of the second stiffening profile.

In this and other examples of the present invention the term "facing" refers to at least two surfaces and/or portions or the like positioned such that they are turned towards each other. They may be in direct contact with each other, in indirect contact with each other through other interposed elements/components or they may be arranged at a distance from each other without departing from the invention. This definition of the term "facing" applies to all examples of the present invention wherein the term is used.

The at least one second stiffening profile, may in one example of the present invention, at least partially intersecting the at least one first stiffening profile through the through-passage of the profile member.

In this and other examples of the present invention the term "intersect" refers to at least one part of two or more profiles or the like crossing each other and/or overlapping with each other. They may be fully crossing each other and/or overlapping with each other or they may be partially crossing each other and/or overlapping each other. This definition of the term "intersecting" applies to all examples of the present invention wherein the term is used.

In the examples of the present invention angles α, β, γ and δ are used to define the arrangement of planes which define the first stiffening profile and the second stiffening profile. Each of these angles may suitably be in the range of about 30° to 150°, preferably in the range of about 45° to 135°, more preferably in the range of about 60° to 120° and preferably all of the angles α, β, γ and δ are within the range of about 30° to 150°. It may be the case that at least two of the angles α, β, γ and δ are essentially the same, but it is also plausible that each of the angles differ from each other. The angles may vary within these intervals as the stiffening profiles may be curved or adapted to be curved in one or more directions. For example a stiffening element arranged on a single curved or double curved surface of a structural element is adapted to conform to the curvature of the surface of the structural element i.e. being geometrically compensating and thus the angles of the planes defined by the stiffening profiles of the stiffening element can vary within these intervals. In an example of the present invention the surface of structural element may be essentially flat and the angles α, β, γ and δ may be essentially perpendicular.

In the context of this application the term geometrically compensating refers to a structure being adaptable to conform to the geometry of another surface of an element or the like.

The hereinbefore definitions applies to all examples of the present invention described below.

Figure 2:
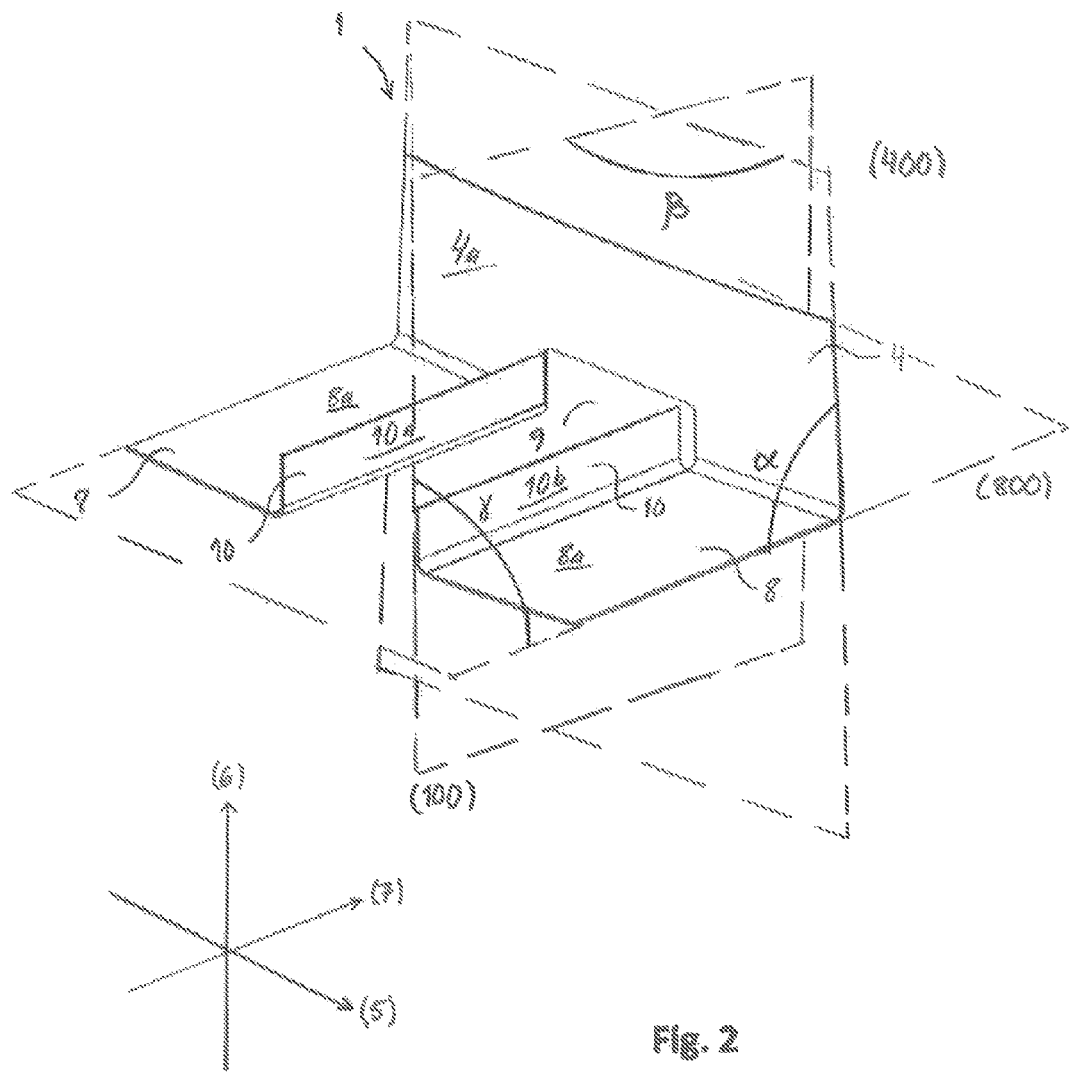
FIG. 2 schematically illustrates a perspective view of a first stiffening profile according to one example of the present invention.

FIG. 1 schematically illustrates an exploded perspective view of a stiffening element 11 according to one example of the present invention. The stiffening element 11 comprises a first stiffening profile 1 and a second stiffening profile 2. The first stiffening profile 1, illustrated in FIG. 1B, comprises a profile member 4 having a first surface 4a and a second surface 4b (not visible in the FIG. 1) opposite to the first surface 4a, a length extending in a first direction 5, a height extending in a second direction 6, and a width extending in a third direction 7. The length and height of the profile member 4 extends in a first plane 400 as shown in FIG. 2. Furthermore, the first stiffening profile 1 comprises a through-passage 9 extending through the profile member 4, in the third direction 7 of the profile member 4. The through-passage 9 provides an opening in the profile member 4. The first stiffening profile 1 also comprises two structural flanges 8. At least one edge and/or part of the first surface 4a of the profile member 4 and each of the two structural flanges 8 are connected. The structural flanges 8 are arranged at a distance from each other essentially corresponding to the length of the opening, i.e. the size of the opening in the first direction 5 of the profile member 4. Furthermore, the two structural flanges 8 extend in a second plane 800 (as shown in FIG. 2) arranged in an angle α to the first plane 400. The two structural flanges 8 are a part of the structural surface 3 of the stiffening element 11 which means that a surface of each of the structural flanges forms a part of the structural surface 3. The first stiffening profile 1 also comprises two support flanges 10 each having a first support surface 10a and a second support surface 10b. At least one edge and/or surface of each of the two support flanges 10 are connected to the profile member 4 and/or at least one of the structural flanges 8. One of the support flanges 10 extends in a third plane 100 arranged in an angle β to the first plane 400 and/or arranged in an angle γ to the second plane 800. The other support flange 10 preferably extends in a plane essentially parallel to the third plane 100.

As shown in FIG. 1, the profile member and one structural flange may in cross-section form an essentially L-shaped form. However, other forms are also plausible such as essentially V-shaped form.

Even though FIG. 1B illustrates an example comprising two structural flanges, it is also plausible that the stiffening profile comprises only one structural flange. Such an alternative is however less preferred at least in case of the structural surface of the stiffening element being intended to be self-supporting.

Furthermore, even though FIG. 1B illustrates an example wherein there are two support flanges, the first stiffening profile may comprise only one support flange. It is furthermore possible that there are more than two support flanges. For example, two support flanges each connected to a respective structural flange and two support flanges connected to the profile member.

Figure 3:
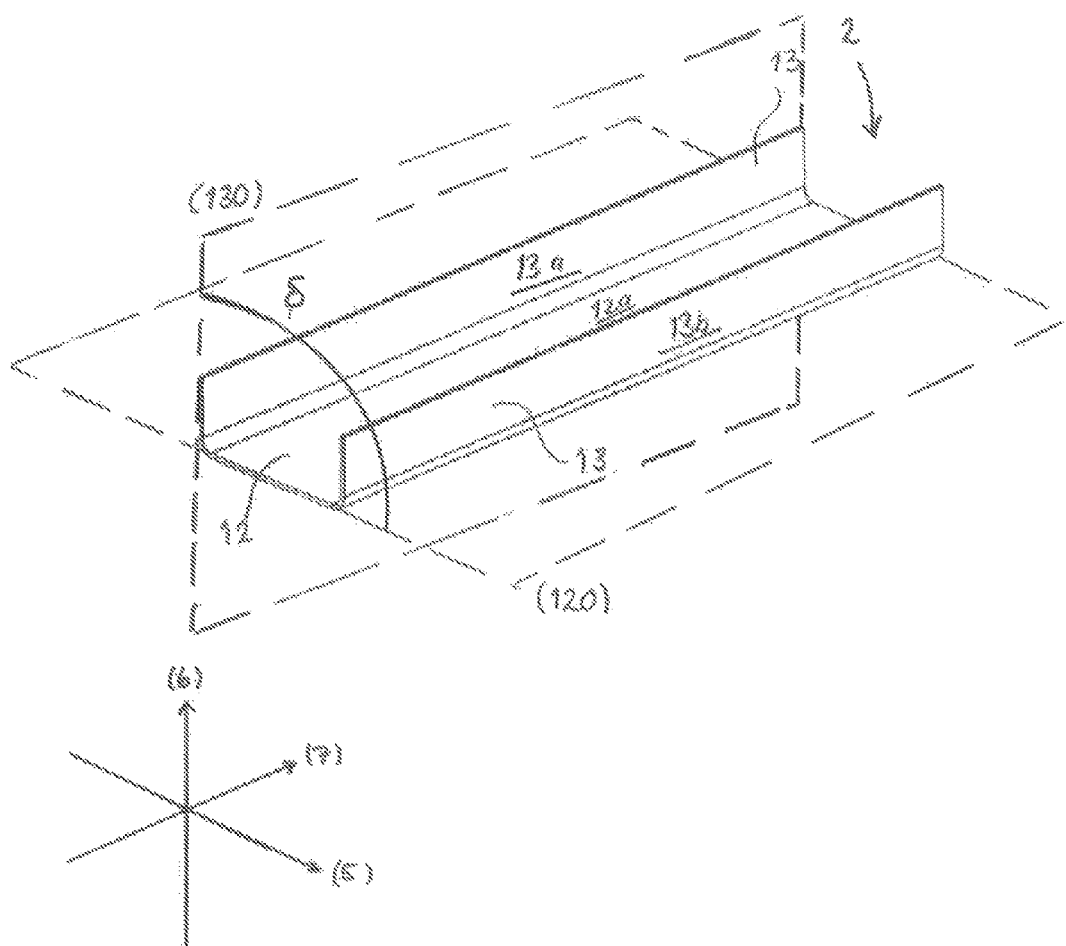
FIG. 3 schematically illustrates a perspective view of a second stiffening profile according to one example of the present invention.

FIG. 1B schematically illustrates the second stiffening profile 2 of the stiffening element 11. The second stiffening profile in this example of the present invention comprises a bottom portion 12 and two support side portions 13. At least one edge and/or surface of the bottom portion 12 and the at least one support side portion 13 are connected. The bottom portion 12 is extending in a forth plane 120 and one of the two support side portions 13 is extending in a fifth plane 130 arranged in an angle δ to the forth plane 120 as shown in FIG. 3. The other of the two support side portions is preferably extending in a plane which is essentially parallel to the fifth plane 130. The bottom portion 12 is a part of the structural surface 3 of the stiffening element 11. The first support surface 10a of each of the support flanges 10 of the first stiffening profile 1 is at least partly arranged adjacently and facing the side portion 13 of the second stiffening profile 2. Furthermore, the support flanges 10 are intended to be directly or indirectly attached at least partially to at least one support side portion 13 of the second stiffening profile 2. In the example shown in FIG. 1A, the second stiffening profile has an essentially U-shaped cross-section when seen in the direction 7. However, it is also plausible that it may have an essentially L-shaped or V-shaped cross-section in case of the second stiffening profile only comprising one support side portion.

For sake of clarity, FIG. 1 shows an example wherein the structural flanges are arranged in a plane essentially perpendicular to the plane of the profile member and the support flanges are arranged in a plane which is essentially perpendicular to each of the plane of the profile member and the plane of the structural flanges. Thus, the angles α, β, γ and δ between the planes are illustrated as being essentially perpendicular. However, the angle α, defined by the angle between the first plane 400 and the second plane 800, may be in the range of about 30° to 150°, preferably in the range of about 45° to 135°, more preferably in the range of about 60° to 120°. The angle α may be essentially perpendicular.

The angle β, defined by the angle between the third plane 100 and the first plane 400, may be in the range of about 30° to 150°, preferably in the range of about 45° to 135°, more preferably in the range of about 60° to 120°. The angle β may be essentially perpendicular.

The angle γ, defined by the angle between the second plane 800 and third plane 100, may be in the range of about 30° to 150°, preferably in the range of about 45° to 135°, more preferably in the range of about 60° to 120°. The angle γ may be essentially perpendicular.

The angle δ, defined by the angle between the fourth plane 120 and fifth plane 130, may be in the range of about 30° to 150°, preferably in the range of about 45° to 135°, more preferably in the range of about 60° to 120°. The angle δ may be essentially perpendicular.

Preferably all of the angles α, β, γ and δ are within the range of about 30 to 150°. The angles α, β, γ and δ may all have essentially the same value in case of being perpendicular, i.e. when the stiffening element is not curved, but may also differ from each other depending on the curvature of the stiffening element and its constituents.

FIG. 2 more clearly illustrates a first stiffening profile 1 as shown in FIG. 1B. The two structural flanges 8 of the first stiffening profile 1 each have a first surface 8a and a second surface 8b (not illustrated in FIG. 2). The first surface 8a and the second surface 8b of the structural flanges 8 are arranged essentially parallel. Thus, the structural flanges 8 may essentially be flat elements which are adapted to be curved in one or more direction. The structural flanges 8 are preferably arranged in the same plane 800. The second surface 8b is intended to constitute a part of the structural surface, see also FIG. 5.

As can be seen in FIG. 2, the profile member 4 of the first stiffening profile is monolithic in the sense that it is made of one continuous piece of material. Furthermore, each of the support flanges and structural flanges of the first stiffening profile are monolithic as such. However, the profile member and/or support flange and/or structural flange may be joined together by means of attachment means such as bolts, stitching, adhesive or welding.

Furthermore, even though not illustrated in FIG. 2 the first stiffening profile 1 may in a further example of the invention comprise only one structural flange 8 connected to the profile member 4 by at least one edge and/or surface of the structural flange 8.

The two support flanges 10 of the first stiffening profile 1 each have a first surface 10a and a second surface 10b, as illustrated in FIG. 2. The first surface 10a and the second surface 10b of the support flanges 10 are arranged essentially parallel. Thus, the support flanges 10 may be essentially flat elements which are adapted to be curved in one or more directions.

The first surface 10a of the support flange 10 is preferably arranged such that it forms an extension of the through-passage in the width extending in the third direction 7 of the profile member 4.

Even though FIG. 2 illustrates an example wherein each of the two support flanges 10 are connected to a structural flange 8, it is also plausible that the two support flanges 10 may be connected to the profile member 4 by at least one edge and/or surface of the support flange 10.

Furthermore, even though FIG. 2 illustrates an example wherein each of the two support flanges 10 are connected to a structural flange 8 each of the two support flanges 10 may be connected both to the profile member 4 and to one of the two structural flanges 8 by at least two different edges and/or surfaces of the support flange 10.

The through-passage 9 extending through the profile member 4 in the third direction 7 of the profile member 4 provides an opening in the profile member 4. The opening provided in the profile member 4 may be essentially rectangular, as illustrated in FIG. 2. However, the shape of the opening provided by the through-passage 9 is not restricted to this shape, but may be any shape allowable to achieve the purpose of the present invention. In other examples of the present invention opening provided by the through-passage may be essentially triangular or square shaped.

FIG. 3 more clearly illustrates the second stiffening profile 2 as shown in FIG. 1A comprising a bottom portion 12 and two support portions 13. The bottom portion 12 of the second stiffening profile 2 has a first surface 12a and a second surface 12b (not illustrated in FIG. 3). The first surface 12a and the second surface 12b of the bottom portion 12 are arranged essentially parallel. Thus, the bottom portion 12 may essentially be a flat element which is adapted to be curved in one or more direction. The second surface 12b is intended to constitute a part of the structural surface 3 of the stiffening element 11, see also FIG. 5.

Each of the two support side portion 13 of the second stiffening profile 2, illustrated in FIG. 3, has a first surface 13a and a second surface 13b. The first surface 13a and the second surface 13b of the support side portions 13 are arranged essentially parallel. Thus, the support side portions 13 may essentially be flat elements which are adapted to be curved in one or more directions. The two support side portions may be essentially parallelly arranged to each other at a distance from each other essentially corresponding to the size of the through opening 9 in the profile member 4.

Even though not shown in FIG. 3 the second stiffening profile 2 may in a further example of the invention comprises a bottom portion 12 and only one support side portion 13. At least one edge and/or surface of the bottom portion 12 and the support side portion 13 are connected. In this example of the present invention the second stiffening profile 2 has an essentially L-shaped cross-section.

Figure 4:
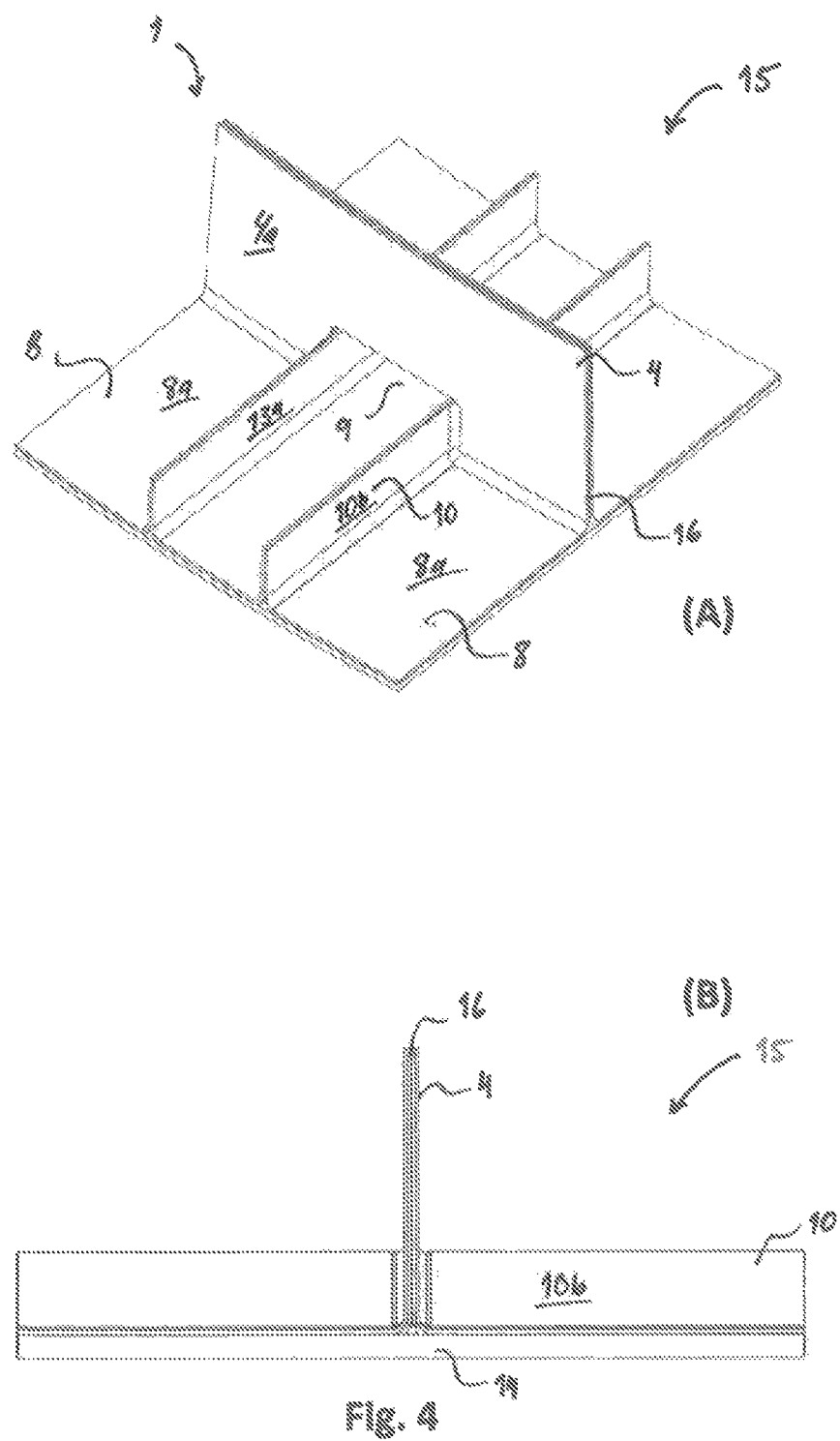
FIG. 4A schematically illustrates a perspective view of a stiffening element arranged on a structural element together forming a reinforced structure, according to one example of the present invention.
FIG. 4B schematically illustrates a side view of the reinforced structure shown in FIG. 4A.
Figure 5:
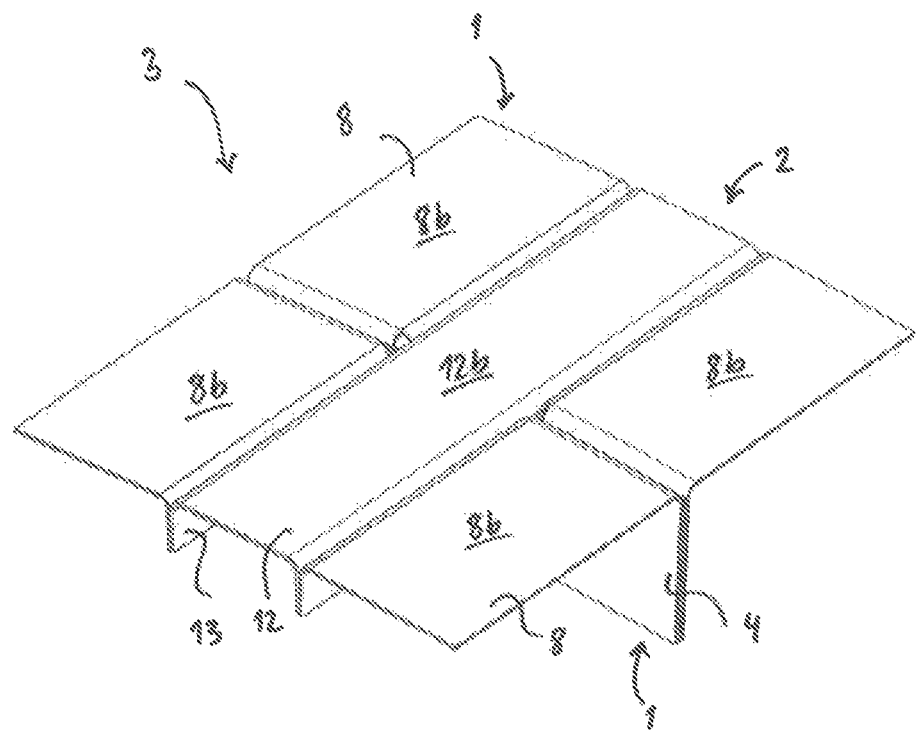
FIG. 5 schematically illustrates a perspective view of two first stiffening profiles and a second stiffening profile together forming a structural surface and constituting a stiffening element.

A reinforced structure according to the present invention comprises at least one stiffening element and a structural element. The structural element is at least partially attached to the stiffening element. FIG. 4A schematically illustrates one example of a reinforced structure according to the present invention. The stiffening element 11 and the structural element 14 together form a reinforced structure 15. In this example of the present invention the stiffening element 11 comprises two first stiffening profiles 1 and a second stiffening profile 2. The two first stiffening profiles 1 and the second stiffening profile 2 together form a structural surface 3 of the stiffening element 11, as shown in FIG. 5. Each of the two first stiffening profiles 1 comprise two structural flanges 8 connected to the profile member 4 by at least one edge and/or surface of the first surface 4a of the profile member 4. The two structural flanges 8 are extending in a second plane 800 arranged in an angle α to the first plane 400, and the two structural flanges 8 are a part of the structural surface 3, as shown in FIG. 5. Furthermore, each of the two first stiffening profiles 2 is provided with a through-passage 9. The through-passage 9 extends through the profile member 4 of each of the two first stiffening profiles 1, in the third direction 7 of the profile member 4. The through-passage 9 provides an opening in each of the profile members 4. Furthermore, each of the two first stiffening profiles 1 comprises two support flanges 10 each having a first support surface 10a and a second support surface 10b. Each of the two support flanges 10 are connected to one structural flange 8 by at least one edge and/or surface of the support flange 10. One of the support flanges 10 is extending in a third plane 100 arranged in an angle β to the first plane 400 and/or arranged in an angle γ to the second plane 800. The other support flange 10 preferably extends in a plane essentially parallel to the third plane 100.

The two first stiffening profiles 1 according to the example of the present invention illustrated in FIG. 4A are arranged such that the first surface 4a of the profile member 4 of each of the two first stiffening profiles 1 are facing away from each other, i.e. the second surfaces 4b of the profile members 4 are facing each other. In this arrangement the two first stiffening profiles 1 form a profile having essentially a T-shaped cross-section. "Sandwiched" in between the second surfaces 4b of the two profile members 4 are two reinforcement elements 16. The second stiffening profile 2 of the stiffening element 11 comprises a bottom portion 12 and two support side portions 13. At least one edge and/or surface of the bottom portion 12 and of each of the two support side portions 13 are connected. The bottom portion 12 is extending in a forth plane 120 and the two support side portions 13 are both extending in a fifth plane 130 arranged in an angle δ to the forth plane 120. The bottom portion 12 of the second stiffening profile is a part of the structural surface 3 of the stiffening element 11, as shown in FIG. 5. In this example the second stiffening profile 2 has an essentially U-shaped cross-section. The first stiffening profile 1 and the second stiffening profile 2 are arranged such that the first support surface 10a of each of the two support flanges 10 of the each of the two first stiffening profiles 1 are at least partly arranged adjacently and facing one of the two support side portions 13 of the second stiffening profile 2. In this example the second stiffening profile 2 intersects the first stiffening profile 1, as seen in FIG. 4A and in the side view FIG. 4B. The stiffening element 11 according to this example of the present invention is arranged on a structural element 14, together forming a reinforced structure 15. The structural surface 3 of the stiffening element 11 is in this example at least partially attached to an element surface of the structural element 14. The angles α, β, γ and δ is in this example shown as being essentially perpendicular and the element surface of the structural element 14 is in this example illustrated as being essentially flat.

Even though FIG. 4A illustrates a reinforced structure comprising a stiffening element comprising two first stiffening profiles 1, the reinforced structure according to the invention is not limited to such an embodiment. The reinforced structure may alternatively comprise a stiffening profile comprising one first stiffening profile.

Moreover, the stiffening element comprising two first stiffening profiles as shown in FIG. 4A may alternatively be applicable without a structural member without departing from the scope of the present disclosure.

Even though the angles α, β, γ and δ are shown as being essentially perpendicular in FIG. 4A and FIG. 4B the angles α, β, γ and δ may in further examples of the present invention be in the range of about 30° to 150°, preferably in the range of about 45° to 135°, more preferably in the range of about 60° to 120°, and preferably all of the angles α, β, γ and δ are within the range of about 30 to 150°.

In FIG. 4A and FIG. 4B the second stiffening profile 2 is interceding the first stiffening profile 1 through the through passage 9 in the first stiffening profile 1. However, in further examples of the invention the at least one second stiffening profile 2 may only be partially intersecting the first stiffening profile 1 through the through-passage 9 of the first stiffening profile 1. Alternatively, at least the bottom portion 12 and/or the at least one support side portion 13 of the second stiffening profile 2 may extend near or up to the through-passage 9 of the first stiffening profile 1.

Figure 6:
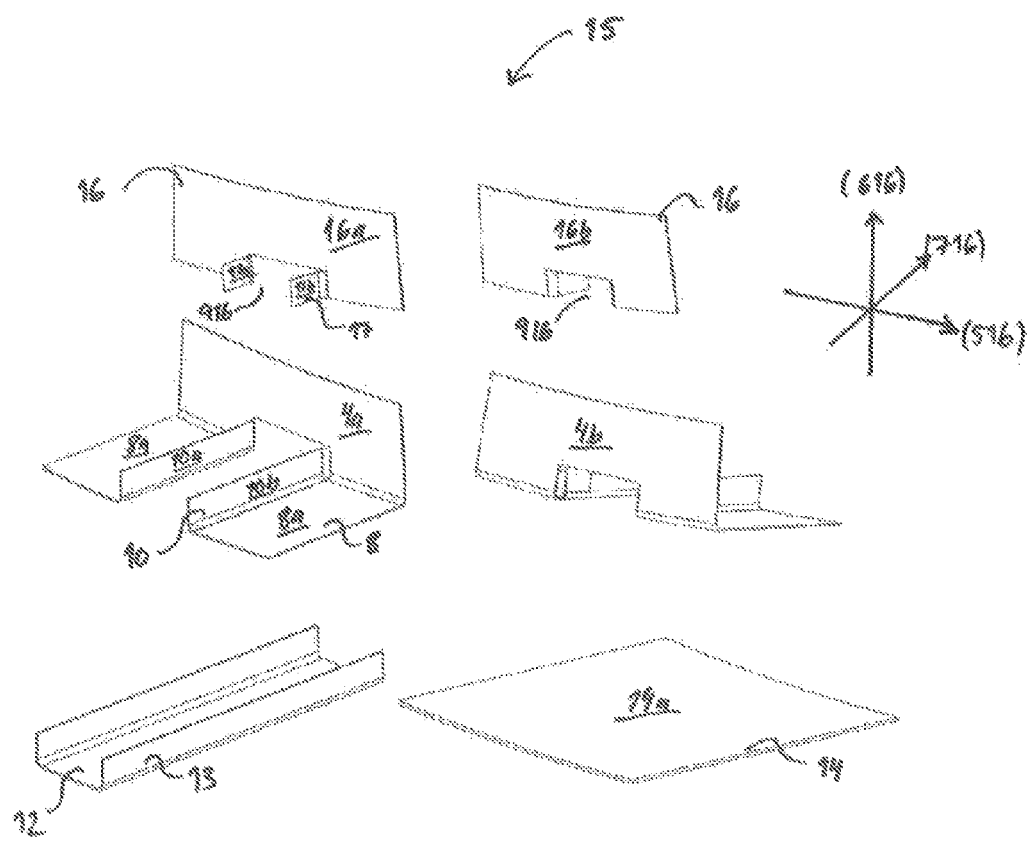
FIG. 6 schematically illustrates an exploded perspective view of a reinforced structure comprising two first stiffening profiles, a second stiffening profile, two reinforcement elements and a structural element, according to one example of the present invention.

FIG. 6 illustrates an exploded view of the constituent parts of the reinforced structure 15; first stiffening profiles 1, reinforcement elements 16, second stiffening profile 2 and structural element 14.

In FIG. 6 reinforcement elements 16 are illustrated having a first surface 16a and a second surface 16b opposite to the first surface 16a. The reinforcement element 16 has a length extending in a first direction 516, a height extending in a second direction 616, and a width extending in a third direction 716. The reinforcement element 16 is provided with a through-passage 916. The through-passage 916 extends through the reinforcement element 16, along the third direction 716 of the reinforcement element 16. The through-passage 916 provides an opening in the reinforcement element 16. Furthermore, the reinforcement element 16 comprises two reinforcement flanges 17. At least one edge and/or part of each of the reinforcement flanges 17 and the reinforcement element 16 are connected.

Even though not illustrated in FIG. 6 the reinforcement element 16 may in a further example of the present invention have no reinforcement flanges 17. In yet further examples of the present invention the reinforcement element 16 may have only one reinforcement flange.

Preferably, in the present invention the length and height of the reinforcement element 16 are essentially equivalent to the length and height of the profile member 4 of the at least one first stiffening profile 1. Alternatively, either the length or the height is essentially equivalent to the length or height of the profile member 4 of the at least one first stiffening profile 1. Alternatively, either or both the length and the height of the reinforcement element 16 are less than that of the length and the height of the profile member 4 of the at least one first stiffening profile 1.

The width (i.e. thickness) of the reinforcement element 16 may be chosen such that desirable reinforcement properties are achieved.

Preferably, the reinforcement element 16 is made of a material having reinforcing properties. In addition to having reinforcement properties the reinforcement element may have adhesive properties. The reinforcement element may be made a composite material. Reinforcement materials are as such previously known and will thus not be disclosed in detail in the present disclosure. It will be readily apparent to the skilled person, depending on the application of the stiffening element or reinforced structure, what would constitute a suitable material for the reinforcement element.

Moreover, the at least one reinforcement element 16 may be replaced or combined with at least one reinforcement layer. The reinforcement layer may be a sheet, paint or film. For example the reinforcement layer may be applied to the second surface 4b of the at least one profile member 4.

Figure 7:
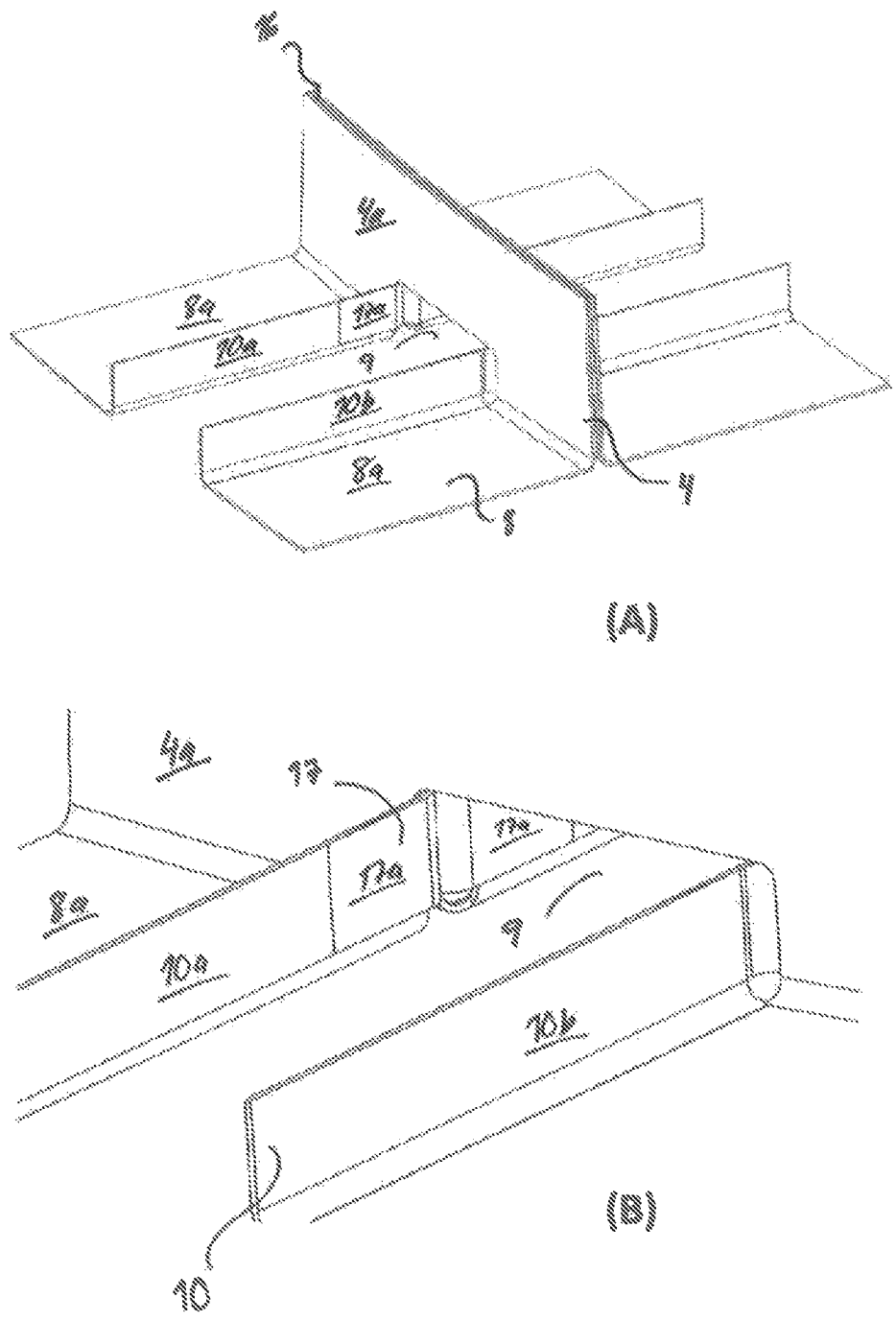
FIG. 7A schematically illustrates a perspective view of an arrangement of two reinforcement elements and two first stiffening profiles, according to one example of the present invention.
FIG. 7B schematically illustrates a magnified perspective view of the arrangement of the two reinforcement elements and the two first stiffening profiles as illustrated in FIG. 7A.

In FIGS. 7A and 7B two first stiffening profiles 1 are illustrated. The first stiffening profiles are illustrated having two reinforcement elements 16 sandwiched between the second surfaces 4b of the profile member 4 of each of the two first stiffening profiles 1. In this example each reinforcement element 16 having a first surface 16a and a second surface 16b opposite to the first surface 16a comprises two reinforcement flanges 17. The reinforcement flanges 17 of each of the reinforcement elements 16 are arranged such that the second surface 17b of the reinforcement flange 17 is facing the first surface 10a of the support flanges 10 of each of the first profile members 1.

Even though not illustrated in FIGS. 7A and 7B in further examples of the present invention the at least one reinforcement element 16 and/or reinforcement layer may only be covering the first surface of the profile member 4 of the two first profile members 1. In further examples of the invention the at least one reinforcement element 16 having at least one reinforcement flange 17 and/or reinforcement layer may be covering part of or the entire first support surface 10a of at least one of the support flanges 10 of the first stiffening profile 1. In yet further examples of the present invention the at least one reinforcement element 16 and/or reinforcement layer may be designed to cover at least part of the first support surface 10a support flanges 10 of the first stiffening profile 1.

Furthermore, the at least one reinforcement element 16 and/or reinforcement layer may be combined with or replaced by one or more adhesive element and/or adhesive layer.

Preferably, the at least reinforcement element 16 and/or reinforcement layer are made of a material having reinforcement properties. The reinforcement element may for example be made of a composite material.

Preferably, the at least one adhesive element and/or adhesive layer are made of a material having adhesive properties. The adhesive element may for example be made of resin or epoxy based material. Adhesive materials are as such previously known and will thus not be described in further detail in the present disclosure. It will be readily apparent to the skilled person, depending on the application of the stiffening element or reinforced structure as well as the material of the different parts thereof, which adhesive materials would be suitable.

The reinforcement element and/or adhesive element may in one example of the present invention be a sheet or a film.

The reinforcement layer and/or adhesive layer may in one example of the present invention be paint or a coating.

In an example of the present invention the first stiffening profile and the second stiffening profile as well as the structural element are all made of composite material.

In another example of the present invention the structural element may be made of a metallic material such as aluminum or its alloys and the first stiffening profile and the second stiffening profile may be made of a composite material.

In yet another example of the present invention the first stiffening profile, the second stiffening profile and the structural element are all made from different material.

The composite material may comprise sheets of fibers in which the fibers in each sheet have one direction (unidirectional reinforcement) or several directions (fabric reinforcement), including fibers arranged in three dimensions.

The composite material may for example be composite fiber preimpregnated with resin i.e. so called prepregs that are stacked.

Prepreg is the shortened name used for composite fibers that have been pre-impregnated with resin but not yet permanently cured (semi cured). These usually take the form of thin sheets consisting of a combination of a matrix (or resin) and fiber reinforcement. The fibers in each sheet can have one direction (unidirectional reinforcement) or several directions (fabric reinforcement). If the fibers are unidirectional the solid structure is obtained by placing a number of prepregs on top of each other, with varying fiber direction. However, the direction of the fibbers in each layer may be the same. Each layer may also have fibers with several directions (fabric reinforcement). The role of the matrix or resin is to support the fibers and bond them together in the composite material. It also keeps the fibers in their position and chosen orientation.

In the present invention the at least one first stiffening profile 1 may preferably comprise fibers for resin injection and/or resin preimpregnated fibers.

Furthermore, the at least one second stiffening profile 2 may preferably comprises fibers for resin injection and/or resin preimpregnated fibers.

Also the structural element 14 may preferably comprise fibers for resin injection and/or resin preimpregnated fibers.

The fibers for resin injection and/or resin preimpregnated fibers may be selected from the group consisting of organic fiber or silicon based fiber, carbon fiber, glass fiber and aramid fiber or combinations thereof. However, the choice of fiber applicable for the present invention is not restricted to the herein listed fibers.

The resin (or matrix) may be a thermosetting resin selected from the group consisting of epoxy resin, bismaleimide resin, cyanate esters based resin, phenyl ethynyl-terminated imide (PETI) resin and phenol resin or combinations thereof.

The resin may be a thermoplastic resin selected from the group consisting of polyether ether ketone (PEEK), polyether ketone ketone (PEKK), Polyfenylensulfid (PPS), Polyeterimid (PEI), nylon 6, nylon 66, polyethylene tereptphalate (PET) or combinations thereof.

Furthermore, the resin may be a mixture of a thermosetting resin and a thermoplastic resin. The choice of resin applicable in the present invention is not limited to the resins herein listed.

Figure 8:
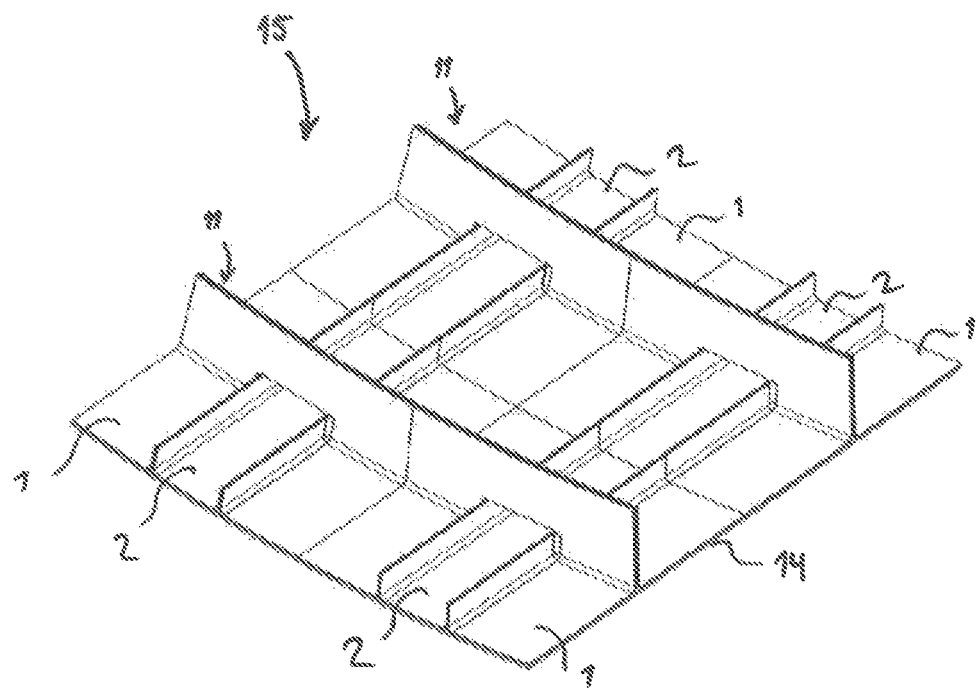
FIG. 8 schematically illustrates a reinforced structure comprising a plurality of stiffening elements arranged on an element surface of a structural element, according to one example of the present invention.
Figure 9:
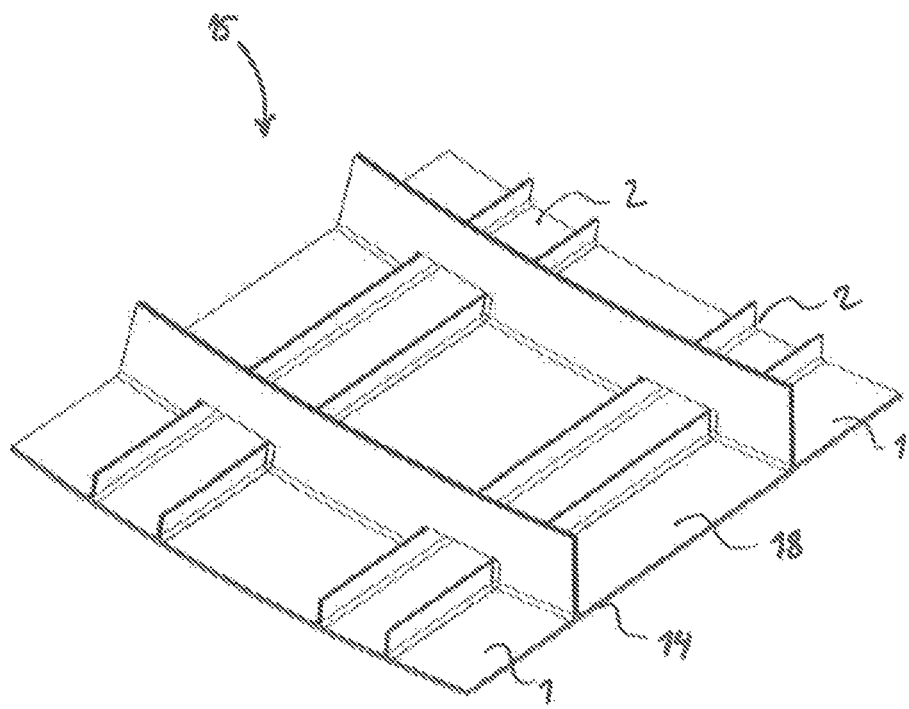
FIG. 9 schematically illustrates a reinforced structure comprising a plurality of stiffening elements arranged on an element surface of a structural element, according to another example of the present invention.

FIGS. 8 and 9 illustrates additional examples of reinforced structures 15 according to the present invention.

In FIG. 8, a plurality of stiffening elements 11 are arranged adjacent each other on a surface of a structural element 14. In FIG. 8, the reinforced structure is slightly curved.

FIG. 9 illustrates an example where the stiffening element 11 comprises two first stiffening profiles 1 arranged at a distance from each other and an interposed third stiffening profile 18 essentially designed as a first stiffening profile but with two profile members 4 together with the connecting support flanges forming a cross-sectional U-shape seen in the length direction 5 of a profile member 4. The stiffening element 11 further comprises two second stiffening profiles 2 arranged at a distance from each other and essentially parallel. The stiffening element 11 is arranged on a structural element 14. Also in this figure, the reinforced structure is slightly curved.

The present invention relates to a stiffening element, described by examples hereinbefore.

The present invention also relates to a method for manufacturing a stiffening element 11 as well as to a method for manufacturing a reinforced structure 15 comprising at least one structural element 14 and at last one stiffening element 11. FIGS. 4A and 4B as well as FIG. 8 and FIG. 9 illustrate examples of reinforced structures according to the present invention. The manufacturing methods according to the present invention are described hereinafter.

Figure 10:
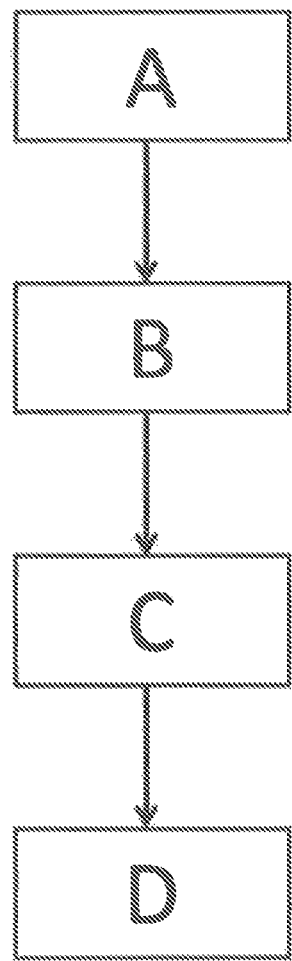
FIG. 10 shows a flow chart representative of the steps of a method for manufacturing a stiffening element, according to one example of the present invention.

FIG. 10 illustrates a flowchart representative of the major steps of a method for manufacturing a stiffening element according to the present invention. The method for manufacturing the stiffening element comprises a first step (Step A) of providing the at least one first stiffening profile 1. The first stiffening profile 1 comprises a profile member 4 having a first surface 4a and a second surface 4b opposite to the first surface 4a, a length extending in a first direction 5, a height extending in a second direction 6, and a width extending in a third direction 7. The length and height of the profile member 4 define a first plane 400. The first stiffening profile 1 also comprises at least one structural flange 8. At least one edge and/or part of the first surface 4a of the profile member 4 and the structural flange 8 are connected. The structural flange 8 is extending in a second plane 800 arranged in an angle α to the first plane 400. The structural flange 8 is a part of the structural surface 3 of the stiffening element 11. Furthermore, the first stiffening profile 1 comprises a through-passage 9 extending through the profile member 4, along the third direction 7 of the profile member 4. The through-passage 9 provides an opening in the profile member 4. The first stiffening profile 1 also comprise at least one support flange 10 having a first support surface 10a and a second support surface 10b. At least one edge and/or surface of the support flange 10 are connected to the profile member 4 and/or the structural flange 8. The support flange 10 is extending in a third plane 100 arranged in an angle β to the first plane 400 and/or arranged in an angle γ to the second plane 800.

In a second step (Step B) of the method for manufacturing a stiffening element the at least one second stiffening profile 2 is provided. The at least one second stiffening profile 2 comprises a bottom portion 12 and at least one support side portion 13. At least one edge and/or surface of the bottom portion 12 and the at least one support side portion 13 are connected. The bottom portion 12 is extending in a forth plane 120 and the at least one support side portion 13 is extending in a fifth plane 130 arranged in an angle δ to the forth plane 120.

Thereafter, the at least one first stiffening profile 1 and the at least one second stiffening profile 2 are assembled (Step C). The at least one first stiffening profile 1 and the at least one second stiffening profile 2 are assembled such that the first support surface 10a of the at least one support flange 10 is at least partly arranged adjacently and facing the at least one side portion 13 of the at least one second stiffening profile 2.

The at least one first stiffening profile 1 and the at least one second stiffening profile 2 are co-cured and/or at least partially attached (Step D).

In the curing step and/or step of at least partial attachment the at least one first stiffening profile 1 and the at least one second stiffening profile 2 adhere to each other, thereby forming a stiffening element 11 according to the present invention.

In addition to the above mentioned steps of the method for manufacturing a stiffening element according to the present invention the method may comprise the step of pre-curing (prior to the co-curing step) the at least one first stiffening profile 1 and the at least one second stiffening profile 2.

The third step (Step C) may in a further example of the present invention include assembling the bottom portion 12 and/or the at least one support side portion 13 of the second stiffening profile 2 such that the bottom portion 12 and/or the at least one support side portion 13 at least partially extends near or up to the through-passage 9 of the at least one first stiffening profile 1.

Furthermore, third step (Step C) may in a further example of the present invention include assembling at least one reinforcement element 16 and/or layer with at least one surface of the at least one first stiffening profile 1 and/or to at least one surface the at least one second stiffening profile 2.

Alternatively, at least one reinforcement element 16 and/or layer and at least one adhesive element and/or layer may be assembled to at least one surface of the at least one first stiffening profile 1 and/or the at least one second stiffening profile 2.

In a further example at least one surface of the first stiffening profile and/or the second stiffening profile of stiffening element 11 is provided with at least one adhesive element and/or layer.

By assembling at least one reinforcement element 16 and/or layer with the at least one first stiffening profile 1 and/or the at least one second stiffening profile 2 the reinforcement properties of the at least one first stiffening profile 1 and/or the at least one second stiffening profile 2 can be tailored and adapted for different applications.

By assembling at least one adhesive element and/or layer with the at least one first stiffening profile 1 and/or the at least one second stiffening profile 2 the adhesive properties of the at least one first stiffening profile 1 and/or the at least one second stiffening profile 2 can be tailored and adapted for different applications.

Figure 11:
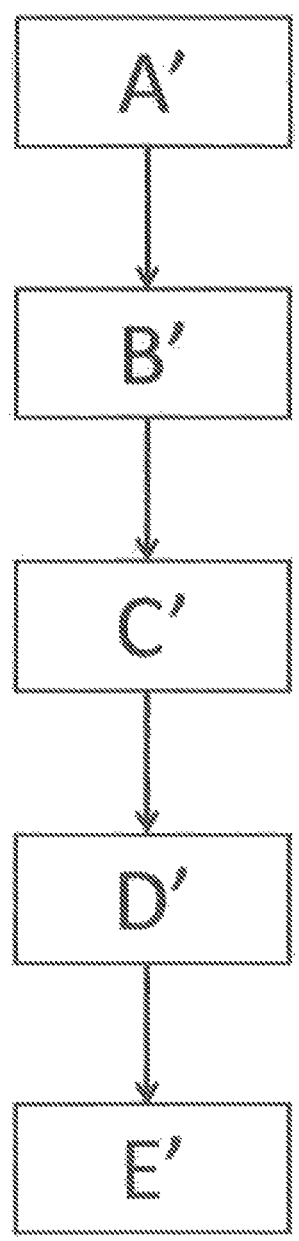
FIG. 11 shows a flow chart representative of the steps of a method for manufacturing a reinforced structure, according to one example of the present invention.

FIG. 11 illustrates a flowchart representative of the major steps of a method for manufacturing a reinforced structure 15 comprising at least one structural element 14 having at least one element surface 14a and at least one stiffening element 11 comprising at least one first stiffening profile 1 and at least one second stiffening profile 2, according to the present invention.

The method for manufacturing a reinforced structure 15 comprises a first step (Step A') of providing at least one structural element 14 having at least one element surface 14a.

In a second step (Step B') of the method at least one first stiffening profile 1 is provided. The first stiffening profile 1 comprises a profile member 4 having a first surface 4a and a second surface 4b opposite to the first surface 4a, a length extending in a first direction 5, a height extending in a second direction 6, and a width extending in a third direction 7. The length and height of the profile member 4 define a first plane 400. The first stiffening profile 1 also comprises at least one structural flange 8. At least one edge and/or part of the first surface 4a of the profile member 4 and the structural flange 8 are connected. The structural flange 8 is extending in a second plane 800 arranged in an angle α to the first plane 400. The at least one structural flange 8 is part of the structural surface 3 of the stiffening element 11. Furthermore, the first stiffening profile 1 comprises a through-passage 9 extending through the profile member 4, along the third direction 7 of the profile member 4. The through-passage 9 provides an opening in the profile member 4. The first stiffening profile 1 also comprise at least one support flange 10 having a first support surface 10a and a second support surface 10b. At least one edge and/or surface of the support flange 10 is connected to the profile member 4 and/or the structural flange 8. The at least one support flange 10 is extending in a third plane 100 arranged in an angle β to the first plane 400 and/or arranged in an angle γ to the second plane 800.

In a third step (Step C') at least one second stiffening profile 2 is provided. The at least one second stiffening profile 2 comprises a bottom portion 12 and at least one support side portion 13. At least one edge and/or surface of the bottom portion 12 and the at least one support side portion 13 are connected. The bottom portion 12 is extending in a forth plane 120 and the at least one support side portion 13 is extending in a fifth plane 130 arranged in an angle δ to the forth plane 120.

Next, the structural surface 3 of the at least one first stiffening profile 1 and the at least one second stiffening profiles 2 are assembled onto an element surface 14a of the at least one structural element 14 (Step D').

Thereafter, the at least one first stiffening profile 1 and/or the at least one second stiffening profile 2 are co-cured and/or at least partially attached to each other and to the at least one structural element 14 (Step E'). In the co-curing step and/or the step of at least partially attaching the at least one first stiffening profile 1 and the at least one second stiffening 2 adhere and/or at least partially attach to each other and/or the at least one structural element 14, thereby forming the reinforced structure 15.

The assembly step (Step C') may in a further example of a method for manufacturing a reinforced structure according to the present invention include assembling at least the bottom portion 12 and/or the at least one support side portion 13 of the second stiffening profile 2 such that the bottom portion 12 or the at least one support side portion 13 at least partially extends near or up to the through-passage 9 of the at least one first stiffening profile 1.

Alternatively, the assembly step of the method (Step C') may in a further example of the invention include assembling the at least one second stiffening profile 2 such that it at least partially intersects the at least one first stiffening profile 1 through the through-passage 9 of the at least one first stiffening profile 1.

In one example of the present the third step (Step C') may include assembling at least one reinforcement element and/or layer with at least one surface of the first stiffening profile 1 and/or to at least one surface of the second stiffening profile 2 of the stiffening element 11 and/or to at least one surface of the structural element 14.

Alternatively, at least one reinforcement element and/or layer and/or at least one adhesive element and/or layer may be assembled to at least one surface of the first stiffening profile 1 and/or the second stiffening profile 2 of stiffening element 11 and/or to at least one surface of the structural element 14.

In a further example at least one surface of the at least one first stiffening profile 1 and/or the at least one second stiffening profile 2 of stiffening element 11 and/or structural element 14 may be provided with at least one adhesive element and/or layer.

By assembling at least one reinforcement element and/or layer with the at least one first stiffening profile and/or the at least one second stiffening profile and/or to the at least one surface of the at least one structural element the reinforcement properties of respective first stiffening profile, second stiffening profile and structural element can be tailored and adapted for different applications.

By assembling at least one adhesive element and/or layer with the at least one surface of the first stiffening profile 1 and/or the at least one second stiffening profile 2 and/or structural element the adhesive properties of respective profile and element can be tailored and adapted for different applications.

In any one of the above mentioned examples of a method for manufacturing a stiffening element or a method for manufacturing a reinforced structure, according to the present invention, the step of providing at least one first stiffening profile 1 can comprise a step of forming a material into a predetermined shape.

In any one of the above mentioned examples of a method for manufacturing a stiffening element or a method for manufacturing a reinforced structure, according to the present invention, the step of providing at least one second stiffening profile 2 can comprise a step of forming a material into a predetermined shape.

In any one of the above mentioned examples of a method for manufacturing a stiffening element 11 or a method for manufacturing a reinforced structure 15 the step of providing at least one structural element 14 may comprise a step of forming a material into a predetermined shape.

The material to be formed may be an essentially flat material, hereinafter referred to as a blank material. Alternatively, the material to be formed may be a material with an elongated cord like shape.

The material may be formed in to a shape of a first stiffening profile 1. The first stiffening profile 1 may be in a semi-cured state prior to forming.

A semi-cured state refers to a state in which the material being formed essentially maintains its shape, when subjected to the force of gravity, whilst the material at the same time is being alterable upon the application of a forming force (larger than the force of gravity).

The material may be formed in to a shape of a second stiffening profile 2. The formed second stiffening profile 2 may be in a semi-cured state prior to forming.

The material may be formed into a structural element 14. The formed structural element 14 may be in a semi-cured state prior to forming. The material may be formed into a double curved structural element. Alternatively, the material may be formed into a single curved structural element.

The blank material may provide using any one of the techniques of Automated Tape Layering (ATL), Automated Fiber Placement (AFP), Pick and Place and Hand Lay-Up (HLU) or combinations thereof. However, the method for providing a blank material is not restricted to these techniques, for the present invention.

The manufacturing methods above might be used in combination with forming such as mechanical forming vacuum forming (including Hot Drape Forming (HDF)), robot forming or combinations thereof.

Using any one of the techniques; ATL, AFP, and HLU, unidirectional or multidirectional reinforced preimpregnated tapes of optional width can be deposited, formed and laid up in layers to form composite depositions/layups on the outer surface of a forming tool. Prepreg tapes including fibers that extend continuously within the tape may be applied in the longitudinal direction of the blank material. Perpendicular and diagonally to the longitudinal direction of the blank, sections of prepreg tape can be applied, resulting in fiber orientation in a direction transverse and diagonally to the longitudinal direction of the blank. Other layers may have fibers aligned in different directions. These and other directions can be determined from the desired properties of the material.

By performing ATL using an automatic tape laying machine (ATLM) composite material can be formed in a cost-effective way. The manufacture is time-saving and the ATLM can be programmed for different types of blanks.

Alternatively to ATL or in combination with ATL the method of Advanced Fiber Placement (AFP) may be used. AFP resembles ATL, however AFP allows for more complex structures to be produced. Both ATL and AFP deposition/ layup can be applied in the step of providing the at least one first stiffening profile 1, the at least one second stiffening profile 2 and the at least one structural element 14, according to the present invention. Furthermore, ether one or both of these techniques can be used in combination with forming and/or HLU or HLU alone can be used for the purpose of the present invention. Moreover, these techniques may be performed in combination with forming such as mechanical forming vacuum forming (including Hot Drape Forming (HDF)), robot forming or combinations thereof.

For example a forming tool or any other technique known in the art may be used to form the blank material.

In any one of the above mentioned examples of a method for manufacturing a stiffening element 11 according to the present invention, the step of co-curing and/or attaching can be performed by: sealing at least one first stiffening profile 1 and at least one second stiffening profile 2 in a vacuum enclosure, evacuating air from the vacuum enclosure, and heating the at least one first stiffening profile 1, and the at least one second stiffening profile 2.

In any one of the above examples of a method for manufacturing a reinforced structure 15 according to the present invention, the step of co-curing and/or attaching can be performed by sealing at least one of the structural element 14, at least one first stiffening profile 1 and at least one second stiffening profile 2 in a vacuum enclosure, evacuating air from the vacuum enclosure, and heating the at least one structural element 14, the at least one first stiffening profile 1, and the at least one second stiffening profile 2.

In any one of the above examples of a method for manufacturing a stiffening element 11 according to the present invention, the step of co-curing and/or attaching at least one first stiffening profile 1 and at least one second stiffening profile 2 may comprise the step of compressing the at least one first stiffening profile 1 and the at least one second stiffening profile 2 in an autoclave.

In any one of the above mentioned examples of a method for manufacturing a reinforced structure 15, the step of co-curing and/or attaching at least one of the structural element 14, at least one first stiffening profile and at least one second stiffening profile 2 may comprise the step of: compressing the at least one of the structural element 14, the at least one first stiffening profile 1 and the at least one second stiffening profile 2 in an autoclave.

In any one of the above examples of methods for manufacturing a stiffening element 11 according to the present invention the step of attaching the at least one first stiffening profile 1 and/or the at least one second stiffening profile 2 may comprise the step of stitching and/or bolting and/or welding and/or adhering the at least one first stiffening profile 1 and/or the at least one second stiffening profile 2 together.

In any one of the above examples of methods for manufacturing a reinforced structure 15 according to the present invention the step of attaching the structural element 14 and/or the at least one first stiffening profile 1 and/or the at least one second stiffening profile 2 may comprise the step of stitching and/or bolting and/or welding and/or adhering the structural element 14 and/or the at least one first stiffening profile 1 and/or the at least one second stiffening profile 2 together.

In any one of the above examples of methods according to the present invention each or both of the first stiffening profile 1 and the second stiffening profile 2 may be pre-manufactured in a semi-cured state. The first stiffening profile and the second stiffening profile may be assembled to form a semi-cured stiffening element. Alternatively, the semi-cured stiffening profiles may be assembled on an element surface of a structural element to form a reinforced structure.

As mentioned earlier the present invention is particularly, but not exclusively, applicable for the stiffening of air plane structures such as wing shells or fuselages.

The present invention is not in any way restricted to the examples described above. Various other modifications may be made within the scope of the appended claims, as long as the purpose of the invention is achieved. For example, the first and second stiffening profiles may comprise perforations, cut-out holes or the like for example in order to reduce weight. Likewise, the structural element may also comprise perforations or the like. Moreover, the stiffening element may comprise a plurality of first stiffening profiles and/or a plurality of second stiffening profiles. Furthermore, the stiffening element may comprise additional profiles, such as at least a third stiffening profile with a configuration other than the first and second stiffening profiles. It is also plausible that the first stiffening profile and/or the second stiffening profile may comprise a region having a reduced strength, for example in order to control where a possible deformation of the stiffening profiles should occur in case of an overload of the stiffening element or to for the geometrically compensating properties of the stiffening profiles to be further enhanced. Furthermore, the radial space between the structural element and the stiffening profiles of a reinforced structure according to the present invention may be filled with a space filler such as a resin in order to further enhance the strength of the reinforced structure. The through-passage of the first stiffening profile may comprise reinforcement material or the like that fully or partially fills the opening provided by the through passage in the profile member of the first stiffening profile.

The invention claimed is:

1. A stiffening element, comprising:
at least a first stiffening profile and at least a second stiffening profile, said at least one first stiffening profile and said at least one second stiffening profile together forming a structural surface of said stiffening element, wherein the at least one first stiffening profile comprises:
a profile member having a first surface and a second surface opposite to said first surface, a length extending in a first direction, a height extending in a second direction, and a width extending in a third direction, said length and said height defining a first plane,
at least one structural flange, wherein at least one edge and/or part of said first surface of said profile member and said at least one structural flange are connected, and said at least one structural flange is extending in a second plane arranged in an angle α to said first plane, and wherein the at least one structural flange is a part of the structural surface, a through-passage extending through the profile member, along the third direction of said profile member, wherein the through-passage provides an opening in said profile member, and at least one support flange having a first support surface and a second support surface, wherein at least one edge and/or surface of said support flange is connected to said profile member and/or said structural flange and wherein the support flange is extending in a third plane arranged in an angle β to said first plane and/or arranged in an angle γ to said second plane, the at least one second stiffening profile comprises:

a bottom portion and at least one support side portion, wherein at least one edge and/or surface of said bottom portion and said at least one support side portion are connected and wherein said bottom portion is extending in a forth plane and said at least one support side portion is extending in a fifth plane arranged in an angle δ to said forth plane, wherein the first support surface of the at least one support flange of the first stiffening profile is at least partly arranged adjacently and facing the at least one support side portion of the at least one second stiffening profile; and wherein the at least one support flange is directly or indirectly attached at least partially to the at least one support side portion of the second stiffening profile;

said bottom portion is a part of the structural surface;

the structural surface of the stiffening element is assembled to an element surface of at least one structural element;

a second surface of the bottom portion is intended to constitute a part of the structural surface of the stiffening element.

2. The stiffening element according to claim 1, wherein the second stiffening profile at least partially intersects the at least one first stiffening profile through the through-passage of the at least one first stiffening profile.

3. The stiffening element according to claim 1, wherein at least the bottom portion extending in the fourth plane and/or the support side portion extending in the fifth plane of the second stiffening profile at least partially extends near or up to the through-passage of the at least one first stiffening profile.

4. The stiffening element according to claim 1, wherein at least one of the angles α, β, γ and δ is in the range of about 30° to 150°.

5. The stiffening element according to claim 1, comprising at least two first stiffening profiles arranged such that the first surface of the profile member of each of said first stiffening profiles are facing each other.

6. The stiffening element according to claim 5, wherein at least one adhesive element and/or layer is provided between the first surfaces of the profile members facing each other.

7. The stiffening element according to claim 5, wherein at least one reinforcement element and/or layer is provided between the first surfaces of the profile members facing each other.

8. The stiffening element according to claim 1, wherein at least one of the at least one first stiffening profile, the second stiffening profile and the at least one structural element comprises fibers for resin injection and/or resin preimpregnated fibers.

9. The stiffening element according to claim 8, wherein the fibers are selected from the group consisting of organic fiber or silicon based fiber, carbon fiber, glass fiber and aramid fiber or combinations thereof.

10. The stiffening element according to claim 8, wherein the resin is a thermosetting resin selected from the group consisting of epoxy resin, bismaleimide resin, cyanate esters based resin, phenyl ethynyl-terminated imide (PETI) resin and phenol resin or combinations thereof; or a thermoplastic resin selected from the group consisting of polyether ether ketone (PEEK), polyether ketone ketone (PEKK), Polyfenylensulfid (PPS), Polyeterimid (PEI), nylon 6, nylon 66, polyethylene terepthalate (PET) or combinations thereof; or mixtures thereof.

11. A reinforced structure, comprising:

at least one structural element having at least one element surface; and at least one stiffening element according to claim 1, wherein the structural surface of at least one stiffening element is at least partially attached to said structural element.

12. The reinforced structure according to claim 11, wherein at least the structural surface and/or the element surface of the structural element is curved and/or adapted to be curved in at least one direction.

* * * * *